United States Patent Office 2,924,504
Patented Feb. 9, 1960

2,924,504

PROCESS OF REMOVING NITROGEN OXIDES FROM GAS STREAMS OF VARYING COMPOSITION

Ronald E. Reitmeier, Anchorage, Ky., assignor to Chemetron Corporation, Chicago, Ill., a corporation of Delaware No Drawing. Application August 30, 1956
Serial No. 606,985

4 Claims. (Cl. 23—2)

This invention relates generally to the removal of nitrogen oxides from gas mixtures and more particularly to the removal of small amounts of nitrogen oxides by catalytic reduction from gas streams which are subject to periodic variations in composition.

One gas stream of this kind is the tail gas which exits from the nitric acid absorption towers which are utilized in the production of nitric acid by the ammonia oxidation process. In this process ammonia vapor and compressed air at a high temperature are passed over a precious metal catalyst to convert the ammonia to water and nitrogen peroxide, $NO_2$. Since air is customarily used as the source of oxygen, a large excess of nitrogen is present in the gas mixture emerging from the catalytic reactor. This gas mixture is cooled and conducted to an absorption tower where it is passed upwardly in countercurrent flow with respect to water which is introduced at the top of the tower. There absorption of the nitrogen peroxide in water to form nitric acid occurs according to the following equation:

$$3NO_2 + H_2O \rightarrow 2HNO_3 + NO$$

The nitric oxide, NO, which is formed is oxidized in the absorption tower to produce additional nitrogen peroxide which is in turn absorbed. To provide the oxygen for this latter oxidation, excess air, over and above that required to oxidize the ammonia, is utilized. In order to achieve higher efficiency in the absorber, it is customary to operate the absorber under superatmospheric pressure in the neighborhood of about four to about eight atmospheres.

The emerging tail gases from the absorption tower are primarily nitrogen contaminated by traces of nitrogen peroxide and nitric oxide which are not absorbed in the water. Some unreacted oxygen, usually about 2 to 4 percent, is also present. In those cases where the absorption occurs under superatmospheric pressure, it is the usual practice to utilize the energy of the compressed tail gases to operate turbines or other prime movers which drive the equipment for compressing the air supplied to the ammonia oxidation unit. Since approximately ⅘ of the gas compressed is nitrogen which is carried through the process and emerges as tail gas, the decompression of the tail gas, in such manner as to utilize its energy, may supply a large part of the power required to compress the air. In such power recovery arrangements it is customary to conduct the absorber tail gases through heat exchangers so that the hot gases emerging from the ammonia oxidation reactor transfer heat to the tail gases as the hot gases are cooled to a temperature suitable for absorption. Many different arrangements for recovering the power from the absorber tail gases have been proposed, and in virtually all such arrangements a serious corrosition problem has presented itself due to the presence of the nitrogen oxides in the tail gases, which oxides are quite corrosive under the conditions which may be encountered in power recovery engines.

The presence of nitrogen oxides in the tail gases also presents a very serious problem from the standpoint of atmospheric polution, and it has been demonstrated in recent years that such nitrogen oxides in a substantial measure contribute to the so-called "smog" which endangers the health and well-being of the inhabitants of those areas where it occurs. Until recently it was believed that, as long as industrial gases discharged into the atmosphere did not exhibit the characteristic brown nitrogen peroxide plume, they were not objectionable from an atmospheric polution standpoint. Nitric oxide reacts in air to produce brown nitrogen peroxide, but the reaction does not proceed very rapidly unless the concentration of nitric oxide is relatively high, and tail gases containing amounts of nitric oxide sufficient to produce rather severe contamination will often not exhibit the characteristic brown plume formerly associated with excessive contamination. Accordingly, it has recently become the practice in many localities to require operators of industrial plants to maintain the total nitrogen oxides content below prescribed limits rather than to rely upon the presence or absence of the brown nitrogen peroxide plume as determining whether or not polution was occurring. Nitric oxide is much less soluble in water than nitrogen peroxide, and, accordingly, those purification processes of the absorption type which have been used heretofore for nitrogen peroxide removal are not particularly suitable for the effective removal of small amounts of nitric oxide.

An important object of my invention is to provide an effective method of removing both nitrogen peroxide and nitric oxide. It has been suggested heretofore that such removal of nitrogen oxides from gas mixtures could be effected by adding to the gas mixture a reducing gas such as hydrogen, carbon monoxide or a gaseous hydrocarbon decomposable to yield hydrogen in sufficient amount to reduce the nitrogen oxides to free nitrogen and passing the mixture at a relatively high temperature over a reduction catalyst. In such processes there must be added to the tail gas for each mol of nitrogen peroxide at least 2 mols, and for each mol of nitric oxide at least one mol of hydrogen or carbon monoxide. Also, sufficient reducing gas must be provided to reduce the free oxygen which might be present.

In such operations it has been the practice to use either a highly active but expensive precious metal catalyst or a catalyst employing a base metal such as nickel or other readily reducible metal supported upon a porous carrier such as alumina or diaspore or other porous refractory material. In general in such base metal catalysts, the amount of the catalytically active reduced metal has been about the same as is customarily employed in reforming catalysts suitable for the hydrocarbon steam reforming process. Thus the reduced metal content has been about 15 to about 20 percent by weight. With catalysts of this kind it has been found that removal of the nitrogen oxides may be achieved. Catalysts of high activity have been utilized because high activity was deemed to be necessary in order to conserve the amount of reducing gas which had to be added to the tail gas, and since the partial pressure of the added reducing gas is necessarily low, high activity was felt to be essential in order to effect substantially complete removal.

Such processes, it was thought, would be quite effective in purifying nitric acid absorber tail gases because the oxidation-reduction reaction involved is exothermic and would increase the energy of the gases supplied to the power recovery engine. These processes, however, have not been entirely successful, because the composition of the tail gas from a nitric acid absorber utilized in an ammonia oxidation nitric acid plant does not ordinarily have a consistently uniform composition. The principal reason for the variation in composition is that in order to control the operation of the catalytic ammonia oxidation reactor, it is frequently necessary to alter the proportions of air and ammonia supplied to the catalytic reactor in order to prevent overheating of the ammonia oxidation catalyst. These variations in the ratio of ammonia to air, which are most frequently effected by cutting off the ammonia supply when the catalyst temperature becomes excessive, result in sudden and drastic variation in the composition of the tail gas emerging from the absorber with the result that the oxygen concentration therein may suddenly increase from a percent or two up to values as high as 20 percent. Variation of the tail gas composition may also occur because of changes in the relative rate at which excess air for oxidation of the nitric oxide formed in the absorber is supplied.

Heretofore, when it has been attempted to remove nitrogen oxides by reduction with a reducing gas over an active catalyst and sudden increase in the oxygen content of the tail gases occurred, the catalyst bed would suddenly rise to an uncontrollable high temperature destroying the catalyst and damaging the reactor in which it was contained. The sudden temperature rise in the catalyst bed is believed to be due to the rapid oxidation of the reduced catalytic metal and the reducing gas adsorbed thereon.

Accordingly, another very important object of my invention is to provide a catalytic process whereby gas mixtures subject to sudden and drastic changes in composition may be substantially completely purified of nitrogen oxides without producing such temperature variation in the catalyst bed as to destroy the catalyst.

A further object is to provide a process for nitrogen oxide removal which may be utilized to purify nitric acid absorber tail gases and provide effluent gases at a temperature and pressure at which they may be utilized for power recovery operations.

Other objects and advantages of the process of my invention will present themselves to those familiar with the art upon reading the following detailed description.

I have discovered that gas streams contaminated with small amounts of nitrogen oxides and subject to wide variations in composition may be purified of nitrogen oxides by catalytic reduction utilizing selected base metal catalysts of relatively low activity without danger of destroying the catalysts upon variation of the stream composition. In order to carry out my process and effect substantially complete removal of nitrogen oxides, I have found that the temperature of the gas stream must be maintained within certain predetermined limits, its pressure must be greater than atmospheric, and its composition must be such that after the catalytic reduction reaction has occurred the stream is still slightly on the reducing side, i.e., certain small amounts of unreacted hydrogen and/or carbon monoxide should be present.

The preferred catalyst employ easily reduced base metals such as iron, cobalt, nickel and copper dispersed upon a refractory carrier which will resist the temperatures encountered in the reactor. The high temperature alpha aluminas such as are sold under the trade names, Corundum and Alundum, are quite satisfactory. Natural clays such as bentonite, diaspore, fire clay, pipe clay, meerschaum and the permatites may also be used if desired. Similarly, titania, zirconia and magnesia are well suited. Moreover, any of the above materials may be used in conjunction with conventional cements such as Portland, Ciment Fondu, etc. Very favorable results have been obtained by impregnating the active material upon Norton Alundum Spheres which contain about 12 percent silica and 88 percent alumina.

The amount of the base metal employed in the catalyst has been found to be critical, and if less than about 1 percent active metal is present the catalyst is not active enough to effect removal of the nitrogen oxides. If more than about 5 percent of the active metal is present, the catalyst will be too active to withstand the rapid oxidation which may occur when variation in composition of the gas stream occurs. Since the gas stream is subject to variation in composition and may become highly oxidizing for short periods from time to time, the catalytically active metal must be readily reducible in the normally slightly reducing gas stream. Thus such metals as molybdenum, tungsten and chromium are not satisfactory when used alone. Their oxides may, however, in some instances serve as promoters in conjunction with readily reducible metals. Materials which volatilize or decompose at the temperatures prevailing in the catalyst bed should of course be avoided.

Conventional methods of achieving dispersion of the catalytically active material upon the carrier may be employed. In most cases impregnation with a soluble salt of the active metal directly upon the carrier material which may be in the form of pellets, lumps, rings or other conventional catalyst shapes is preferred because of its simplicity. Such impregnation is usually followed by calcination at an elevated temperature to convert the metal salt to the oxide form. Alternatively, mechanical admixture of the active material and the carrier material in powder form followed by pelleting or extrusion to form catalyst shapes is quite satisfactory. If promoted catalysts are to be used, combination operations, such as forming the active metal and the carrier into pellets which are in turn impregnated in a solution of the promoter, may be employed to advantage.

The inlet temperature of the gas stream to be purified at it enters the catalyst bed should be at least about 500° F., and it should not exceed about 1500° F. Under these conditions the outlet temperature will preferably be maintained within the range of about 1500° F. to 1900° F. If the available supply of gas to be purified is not at a sufficiently high temperature, its temperature may be conveniently increased by injecting relatively small amounts of a combustion supporting gas and a fuel under combustion conditions.

It has been found that the gas stream supplied to the catalyst bed must be substantially on the reducing side of neutral if effective removal of nitrogen oxides is to occur. By the same token, the stream emerging from the catalytic reaction zone should be reducing to the extent that its combined total free carbon monoxide and free hydrogen content must be at least 0.2 percent by volume. In most cases this minimum will be somewhat higher, close to 0.4 percent, where high efficiency of contaminant removal is desired. In rare instances as much as 5 percent combined total hydrogen and carbon monoxide may be required.

The space velocity of the gas stream to be treated through the catalyst bed may be quite high and good removal still be obtained, and may range up to about 60,000 volumes of gas per volume of catalyst bed per hour in properly designed reactors.

Certain of the following specific examples will further illustrate my new improved process.

*Example 1*

A nitric acid tail gas of the following composition was introduced into a reactor at a rate of 21,180 s.c.f.m. and at a temperature of 900° F. and a pressure of 90 p.s.i.g.

$O_2$ _____ 2.0
$H_2O$ _____ 0.6
Nitrogen oxides _____ 0.2 ($NO+NO_2$)
Nitrogen _____ 97.2

The reactor contained a catalyst bed four feet in depth and containing 60 cubic feet of catalyst consisting of 1.6 percent nickel, as metallic nickel, supported on an alumina-silica carrier. The point of injection of the tail gas was around a burner at the top of the reactor in which 100 s.c.f. of natural gas and 1000 s.c.f. of air were passed per minute. The purpose of the burner was to raise the temperature of the feed stream. Immediately below the burner at a point adjacent to where the combustion products and the tail gas were mixed, an additional 300 s.c.f.m. of natural gas was introduced through a sparger in order to render the gas mixture on the reducing side. This mixture achieved a temperature of 1150° F. before passing through the catalyst bed. The temperature at the outlet of the catalyst bed was found to be 1600° F., and the effluent gases had the following composition:

| | |
|---|---|
| $O_2$ | 0.0 |
| $H_2O$ | 3.5 |
| Nitrogen oxides | 75 p.p.m. ($NO+NO_2$) |
| $N_2$ | 94.6 |
| CO | 0.1 |
| $H_2$ | 0.3 |
| $CO_2$ | 1.5 |

The reported flow rates represent a space velocity in relation to the tail gas of 20,000. Utilizing a space velocity of 30,000 the total nitrogen oxide leakage was about 200 p.p.m., while at a space velocity of about 10,000 the nitrogen oxide leakage was about 10 to 50 p.p.m. Nitrogen oxides were analyzed by the Orange County Method. This method is described in a booklet entitled "The Determination of Oxides of Nitrogen by the Phenoldisulfonic Acid Procedure," a method proposed by the Air Pollution Control District—County of Los Angeles, dated October 20, 1953.

This example illustrates the efficacy of this process to reduce the nitrogen oxides content of a gas stream to very low values when the stream composition is not varied. The following example illustrates the operation of the process when sudden, drastic variations in stream composition occur.

*Example 2*

The gas stream of Example 1 was conducted through the catalyst bed of that example under identical conditions and at a space velocity of 20,000. The nitrogen oxides were effectively removed. Suddenly the flow of the gas stream to be purified was checked and stream of air heated to the same feed temperature was passed through the catalyst bed, simulating the effect of shutting off the supply of ammonia in an ammonia oxidation process nitric acid plant. A temperature rise in the catalyst bed of less than 200° F. resulted. Inspection at a later time showed that there was no damage to the catalyst bed or to the reactor. The fact that the catalyst was undamaged was also illustrated by restoring the flow of the gas stream to be purified and checking the flow of air. Again the nitrogen oxides were found to be reduced to the desired low value. From this example it will be seen how the process of this invention operates when widely variable gas streams are supplied.

*Example 3*

As a comparison between this process and the prior process utilizing an active catalyst, the reactor of Example 1 was charged with a catalyst containing 13 percent nickel, as metallic nickel, and 6 percent copper, as metallic copper, supported upon a refractory carrier. A gas stream to be purified identical to that of Example 1 was passed through the catalytic reactor under identical conditions to those of Example 1. Effective removal of the nitrogen oxides was obtained. However, when the gas stream was replaced by a stream of air, as in Example 2, the temperature in the catalyst bed suddenly rose to uncontrollably high values estimated to be from 3000° F. to 5000° F. The catalyst was destroyed and the refractory lining of the reactor fused to such extent that it had to be replaced. Thus it will be obvious that the prior process is entirely unsuitable where gas streams of varying composition are to be purified.

*Example 4*

The reactor of Example 1 was charged with a catalyst containing 3.5 percent nickel, as metallic nickel, supported upon an alumina-cement carrier, and the gas stream of Example 1 was passed through the reactor under the conditions of that Example. Effective removal of nitrogen oxides was achieved. Moreover, when the feed stream was replaced by air as in Example 2, no damage to the catalyst or reactor occurred.

From the foregoing it will be appreciated that a novel, improved process has been provided for effectively removing nitrogen oxides from gas streams subject to drastic and sudden variations in composition from slightly reducing to highly oxidizing conditions.

Various changes and modifications in addition to those set forth herein, such as will present themselves to those familiar with the art, may be made without departing from the spirit of this invention whose scope is commensurate with the following claims.

What is claimed is:

1. A process of removing small amounts of nitrogen oxides from a nitric acid plant tail gas stream which consists of nitrogen, nitrogen oxides, oxygen and water vapor, the aggregate total volume of said constituents other than nitrogen being normally less than about 5%, but said stream being subjected from time to time to sharp increases in oxygen content to values approaching 20%; said process comprising continuously admixing with the tail gas stream sufficient amounts of a reducing gas selected from the group consisting of hydrogen, carbon monoxide and hydrocarbons which are vapors at atmospheric conditions to render the normal gas stream slightly reducing; continuously conducting the resulting gas stream through a fixed bed of a catalyst consisting essentially of from 1 to 5% by weight of a metal selected from the group consisting of iron, cobalt, nickel and copper supported upon an inert refractory carrier, said stream passing through said bed at a space velocity of less than 40,000 volumes of gas per volume of catalyst per hour, the inlet temperature of the gas stream entering said bed being so adjusted that the temperature of the effluent gases is between about 1500° F. and about 1900° F., and said nitrogen oxides being reduced by the reducing gas to elemental nitrogen; and from time to time allowing the composition of the tail gas stream to vary from the aforesaid normal composition by sharply increasing the oxygen content thereof.

2. The process of claim 1 in which sufficient reducing gas is added to the tail gas so that the effluent stream from the catalyst bed contains between about 0.2 and 5% total free hydrogen and carbon monoxide.

3. The process of claim 1 in which the active metal of the catalyst is nickel.

4. The process of claim 1 in which the active metal of the catalyst is copper.

References Cited in the file of this patent

UNITED STATES PATENTS

| | | |
|---|---|---|
| 1,962,485 | Dely | June 12, 1934 |
| 2,381,696 | Shapleigh | Aug. 7, 1945 |